March 5, 1968     A. TURNER ETAL     3,372,154

ETHYLENE POLYMER POWDERS AND PROCESS THEREFOR

Filed April 9, 1965     2 Sheets-Sheet 1

INVENTORS
ANDREW TURNER
EDGAR W. WISE
BY
ATTORNEY

March 5, 1968  A. TURNER ETAL  3,372,154
ETHYLENE POLYMER POWDERS AND PROCESS THEREFOR
Filed April 9, 1965  2 Sheets-Sheet 2

INVENTORS.
ANDREW TURNER
EDGAR W. WISE

ATTORNEY

United States Patent Office 3,372,154
Patented Mar. 5, 1968

3,372,154
ETHYLENE POLYMER POWDERS AND
PROCESS THEREFOR
Andrew Turner and Edgar W. Wise, South Charleston, W. Va., assignors to Union Carbide Corporation, a corporation of New York
Filed Apr. 9, 1965, Ser. No. 446,917
4 Claims. (Cl. 260—94.9)

This invention relates to a method for producing powdered ethylene polymers. More particularly, this invention relates to a method for producing powders of polyethylene and ethylene copolymers having melt indices of at least 1.0 dgm./min., and especially melt indices of at least 10 dgm./min.

Powdered ethylene homopolymers and copolymers recently have become important for use in various applications, such as rotational molding, fluidized-bed coatings, spray-coatings and the like. To date, the only commercially-acceptable powders have been obtained by grinding the polymer or dissolving the polymer in hot solvent and rapidly cooling the solution to effect the precipitation of fine polymeric particles which can be recovered by filtration or evaporation. Because of the expense involved in these subsequent steps, considerable effort has been expended in an effort to recover powdered ethylene polymers directly from the polymerization reaction, particularly from the high pressure, free-radical initiated polymerization in a tubular reactor. Processes of this type include quenching the polymer product in water immediately following the pressure let-down from the reactor, as is shown in U.S. Patent No. 2,831,845 to J. W. Biddle et al., or cooling the last section of the high-pressure tubular reactor, as is shown in U.S. Patent No. 3,090,778 to P. Ehrlich et al. Although both of these processes do result in the production of powders, neither has been entirely satisfactory. The Biddle process provides only marginal improvement over the product obtained by the blasting action of the pressure let-down valve alone. Although the Ehrlich process provides very small particles, as determined by microscopic examination, these particles readily form agglomerates, which, when measured by screen analysis, a more practical test for evaluating the flow properties of the powder, are about the same size as the particles obtained without cooling. Moreover, neither process is particularly effective in producing powders of ethylene polymers having melt indices in excess of 5 dgm./min., and particularly in excess of 10 dgm./min., which are the most difficult to produce in powder form and yet, at present, are the polymers which are most desired as powders.

It has been discovered by this invention, however, that if ethylene is employed as a quench fluid by admixing with the polymerization product of a high-pressure, free-radical initiated process prior to pressure let-down, and the resulting mixture is fed through the let-down valve there is obtained a free-flowing polymer powder. In general, the process of this invention will increase the percent of polymer which will pass through a 100 mesh sieve for polymers of all melt indexes and will increase the percent of polymer passing through a 200 mesh sieve at melt indices of 10 dgm./min. or higher.

As indicated, the process of this invention is employed in conjunction with a high-pressure process, such as that commercially employed in tubular reactors or stirred autoclaves. In processes of this type, pressures of from about 10,000 p.s.i. to about 50,000 p.s.i. and temperatures in the range of 150° C. to 250° C. are commonly employed. The free radical initiators which are employed include peroxides, azo compounds and oxygen.

The amount of ethylene quench fluid necessary to achieve a reduction in particle size is not highly critical, and will be readily determined by one skilled in the art. In general, amounts of at least 10 percent by weight, based on ethylene fed to the polymerization reactor, are required to achieve a reduction in particle size with amounts in the range of from about 15 to about 90 weight percent being generally preferred. Amounts higher than this can be employed, but are generally uneconomical, for there is no concomitant reduction in particle size at these levels.

The temperature of the ethylene quench fluid is not narrowly critical, although it should be at least about 100° C. below the temperature at which the polymerization reaction is conducted, and temperatures ranging from −70° C. to +60° C. have been found suitable when the polymerization is conducted at a temperature of about 180 to 250° C.

The mixing of the ethylene quench fluid with the polymerization product may be accomplished in any suitable manner. One suitable apparatus is shown in the accompanying drawings. In these drawings.

Figure 1:
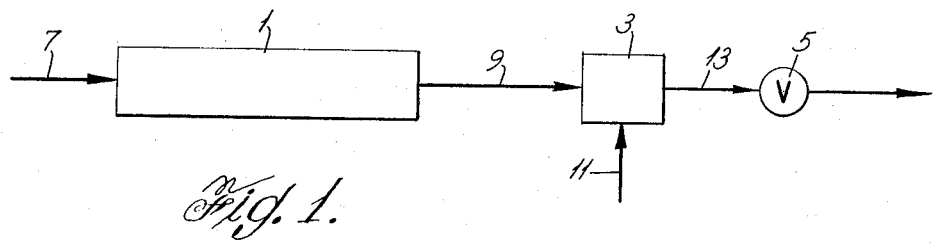
FIGURE 1 is a schematic representation of the reactor and quench system.

With reference to FIGURE 1, the reaction system comprises tubular reactor 1, quench ring 3 and product valve 5. In operation monomer and initiator, as well as suitable comonomers, diluents, telogens and the like, are fed to reactor 1 through line 7 and polymerization is effected in reactor 1. Polymer product is withdrawn from reactor 1 through line 9 and fed to quench ring 3. After mixing with the quench fluid, which is fed through line 11, the polymer product passes through line 13 and product valve 5. After reduction of pressure, the polymer is recovered by any suitable technique known to the art. Unreacted monomer and the quench fluid may be recovered and recycled as desired.

Figure 2:
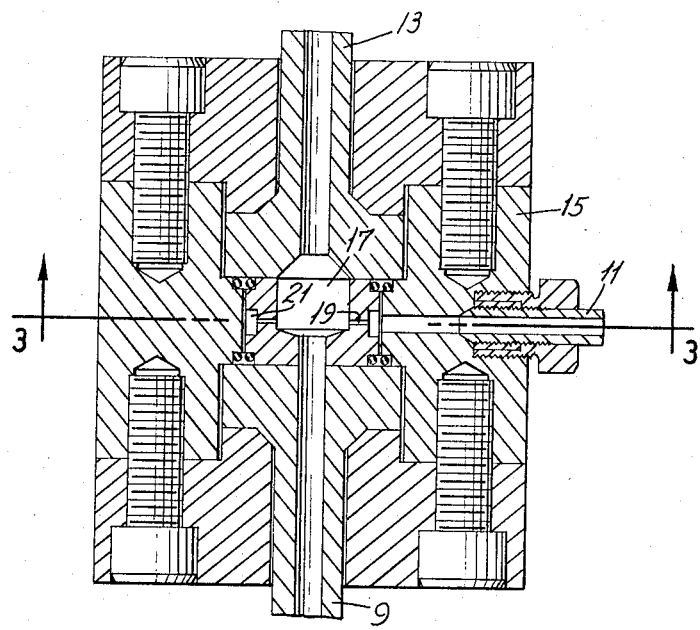
FIGURE 2 is a schematic elevation view, taken in cross-section, of the quench system.
Figure 3:
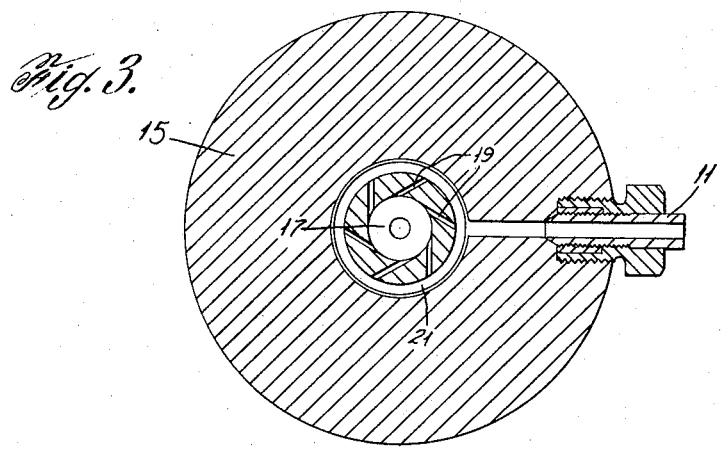
FIGURE 3 is a cross-sectional view of the quench system taken along line 3—3 in FIGURE 2.

With reference to FIGURES 2 and 3, the quench ring comprises body 15 containing mixing chamber 17 and polymer lines 9 and 13. Mixing chamber 17 is equipped with quench fluid entry ports 19, which may be at any desired angle, but preferably are tangentially disposed as shown to achieve good mixing of quench fluid and polymerization product. Quench fluid entry ports 19 connect with annulus 21 which, in turn, connects with quench fluid feed line 11. In operation the quench fluid is fed through line 11 to annulus 21, which distributes the quench fluid to entry ports 19. The quench fluid is ejected from entry ports 19 into mixing chamber 17, where it is intimately mixed with the polymerization product fed through line 9. The resulting mixture then leaves mixing chamber through line 13.

The process of this invention can be employed in conjunction with continuous processes producing polyethylene or copolymers of ethylene with one or more polymerizable comonomers by the high pressure technique, provided the copolymer contains at least about 50 weight percent polymerized ethylene. As examples of suitable comonomers one can mention other olefinic hydrocarbons such as propylene, butadiene and the like; the vinyl and vinylidene halides such as vinyl chloride, vinylidene chloride, vinyl fluoride, vinylidene bromide, and the like; vinyl esters such as vinyl formate, vinyl acetate, vinyl propionate, vinyl butyrate, vinyl chloroacetate, vinyl chloropropionate, and the like; acrylic and alpha-alkyl acrylic acids, their esters, amides, and nitriles such as acrylic acid, chloroacrylic acid, methacrylic acid, ethacrylic acid, methyl acrylate, ethyl acrylate, butyl acrylate, n-decyl acrylate, methyl methacrylate, butyl methacrylate, methyl ethacrylate, ethyl ethacrylate, acrylamide, N-methyl acrylamide, N,N-di-methacrylamide, methacrylamide, N-methyl methacrylamide, N,N-dimethyl methacrylamide, acrylonitrile, chloroacrylonitrile, methacrylonitrile, ethacrylonitrile, and the like; maleic and fumaric acids, and their esters such as dimethyl maleate, diethyl maleate, monobutyl maleate and the like; vinyl alkyl ethers and ketone such as vinyl methyl ether, vinyl ethyl ether, vinyl isobutyl ether, 2-chloroethyl vinyl ether, methyl vinyl ketone, ethyl vinyl ketone, isobutyl vinyl ketone, and the like; N-methyl-N-vinyl acetamide, N-vinyl carbazole, N-vinyl pyrrolidone, ethyl methylene malonate, polymerizable cycloolefins such as bicyclo[2.2.1]hept-2-ene, bicyclo[2.2.2]oct-2-ene, their 5-substituted compounds and the like, bicyclo[2.2.1]hepta-2,5-diene, bicyclo[2.2.2]octa-2,5-diene, and the like.

Example 1

The apparatus employed was similar to that shown in FIGURES 1-3 and described above. Ethylene and air to supply oxygen as the initiator were fed to the reactor, which had a jacket temperature of 215° C. The ethylene pressure was increased to 30,000±2,500 p.s.i. and ethylene was fed to the quench ring. After 30 minutes operation under the selected conditions to stabilize the reaction system, the polymer was collected over a period of 30 minutes. The polymer product was subjected to a screen analysis to determine particle size distribution. The reaction conditions and screen analyses for several runs are summarized in Table I.

Example 2

For purposes of comparison, several experiments were conducted employing apparatus and procedures similar to those described in Example 1, except that no quench fluid was employed. The data for these experiments are summarized in Table II.

Example 3

The process of Example 1 was repeated, except that, instead of quenching the polymer product with ethylene, the polymer product was cooled by feeding water at a temperature of about 25° C. through a four-foot long jacket on the tube just prior to the product valve. The data for these experiments are summarized in Table III.

TABLE III.—EXTERNAL COOLING

| Run No. | 1 | 2 | 3 | 4 | 5 | 6 |
|---|---|---|---|---|---|---|
| Polymerization: | | | | | | |
| Space vel., lb./hr./ft.³ | 2,100 | 2,100 | 2,100 | 2,100 | 2,100 | 2,100 |
| O₂, p.p.m | 133 | 132 | 132 | 132 | 132 | 133 |
| Percent conversion | 19.6 | 18.5 | 17.4 | 18.3 | 18.9 | 21.0 |
| Water feed rate, gm./min | 750 | 4,000 | 2,300 | 2,500 | 4,000 | 830 |
| Product: | | | | | | |
| Melt Index, dgm./min | 7.9 | 8.4 | 8.6 | 9.5 | 15 | 17 |
| Screen Analysis, percent through— | | | | | | |
| 40 mesh | 56 | 44 | 35 | 36 | 30 | 40 |
| 60 mesh | 40 | 32 | 19 | 20 | 15 | 20 |
| 80 mesh | 28 | 20 | 13 | 16 | 10 | 12 |
| 100 mesh | 20 | 16 | 10 | 12 | 7 | 8 |
| 140 mesh | 16 | 11 | 8 | 8 | 4 | 6 |
| 200 mesh | 10 | 9 | 6 | 4 | 1 | 2 |

As can be seen from the foregoing data, the use of external cooling on the reactor (Example 3) produces a powder having a similar particle size distribution to the product obtained by the blasting action of the product valve alone (Example 2), in spite of the fact that the powder produced by the former technique, when analyzed microscopically, has a large number of very fine particles. Apparently these fine particles readily form agglomerates which have a size distribution about the same as the particle distribution obtained without cooling. On the other hand, the process of this invention, as illustrated by Example 1, greatly increases the percent of polymer passing through, for example, a 40-mesh screen.

Figure 4:
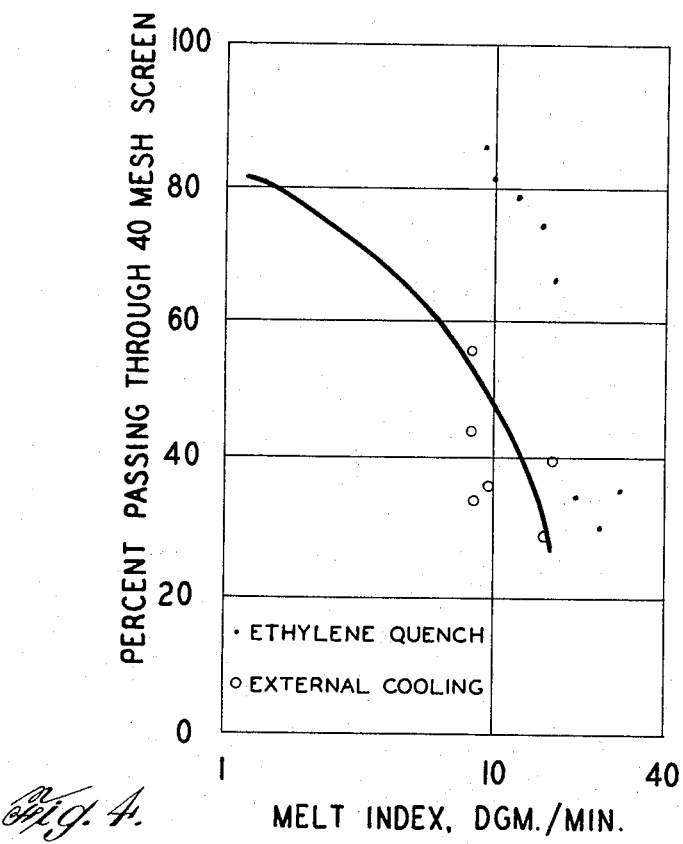

The degree of improvement resulting from the process of this invention is emphasized by the graph of FIGURE 4, where the percent of polyethylene passing through a 40-mesh screen is plotted against the log of polymer melt index. The solid line shown on FIGURE 4 was obtained by plotting the data for a number of runs similar to those of Example 2 wherein no special effort to obtain powdered polyethylene was made. As is apparent, the amount of polymer passing through the screen decreases with increasing melt index. It is readily apparent that the process employing external cooling does not produce a powder much different from the process employing neither cooling nor quenching, for the data from Example 3 fall essentially on the same line. On the other hand, when the data from Example 1 are plotted, it is apparent that a substantial reduction in effective particle size is obtained by the process of this invention, for all these points lie above and to the right of the curve representing the product obtained solely by the blasting action of the product valve.

What is claimed is:

1. In a process for producing a powdered ethylene polymer comprising polymerizing ethylene in contact with a free-radical initiator in a reaction zone at elevated pressure followed by withdrawing the polymerization

TABLE I

| Run No. | 1 | 2 | 3 | 4 | 5 | 6 | 7 | 8 |
|---|---|---|---|---|---|---|---|---|
| Polymerization: | | | | | | | | |
| Space vel., lb./hr./ft.³ | 2,100 | 2,100 | 2,100 | 2,100 | 2,100 | 1,990 | 1,990 | 1,990 |
| O₂, p.p.m | 130 | 126 | 127 | 132 | 124 | 118 | 119 | 119 |
| Percent conversion | 19 | 16.5 | 14.4 | 20 | 20.8 | 18.8 | 20 | 18.2 |
| Quench Fluid: | | | | | | | | |
| Temp., ° C | −15 | 28 | 26 | −70 to −35 | 15−30 | −6 to +7 | −30 to −15 | 5−18 |
| Wt. percent of feed | 60 | 69 | 68 | 60 | 60 | 73 | 71 | 73 |
| Product: | | | | | | | | |
| Melt Index, dgm./min | 8.8 | 9.8 | 12 | 15 | 17 | 20 | 25 | 32 |
| Screen Analysis, percent through— | | | | | | | | |
| 40 mesh | 86 | 81 | 79 | 74 | 66 | 34 | 30 | 36 |
| 60 mesh | 60 | 70 | 67 | 48 | 44 | 20 | 18 | 22 |
| 80 mesh | 42 | 58 | 60 | 34 | 30 | 13 | 12 | 15 |
| 100 mesh | 32 | 51 | 53 | 28 | 22 | 11 | 10 | 12 |
| 140 mesh | 20 | 38 | 40 | 16 | 15 | 8 | 6 | 8 |
| 200 mesh | 12 | 23 | 26 | 10 | 8 | 5 | 4 | 6 |

TABLE II.—NO QUENCH

| Run No. | 1 | 2 | 3 |
|---|---|---|---|
| Polymerization: | | | |
| Space Velocity, lb./hr./ft.³ | 2,400 | 2,480 | 1,990 |
| O₂, p.p.m | 93 | 110 | 130 |
| Percent conversion | 19.5 | 18.5 | 20.9 |
| Product: | | | |
| Melt Index, dgm./min | 6.2 | 10.3 | 12 |
| Screen Analysis, percent through— | | | |
| 40 mesh | 59 | 42 | 41 |
| 60 mesh | 41 | 25 | 25 |
| 80 mesh | 30 | 16 | 16 |
| 100 mesh | 24 | 13 | 12 |
| 140 mesh | 14 | 6 | 4 |
| 200 mesh | 11 | 5 | 1 | product from the reaction zone and reducing the pressure of said polymer product to about atmospheric pressure, the improvement of subsequent to said polymerization and prior to said pressure reduction admixing said polymerization product with ethylene in an amount sufficient to promote the formation of polymer particles of reduced size.

2. In a process for producing a powdered ethylene polymer comprising polymerizing ethylene in contact with a free-radical initiator in a reaction zone at elevated pressure followed by withdrawing the polymerization product from the reaction zone and reducing the pressure of said polymer product to about atmospheric pressure, the improvement of subsequent to said polymerization and prior to said pressure reduction admixing said polymerization product with ethylene in an amount which is at least 10 weight percent of the total weight of monomer fed to said reaction zone.

3. In a process for producing a powdered ethylene polymer comprising polymerizing ethylene in contact with a free-radical initiator in a reaction zone at elevated pressure followed by withdrawing the polymerization product from the reaction zone and reducing the pressure of said polymer product to about atmospheric pressure, the improvement of subsequent to said polymerization and prior to said pressure reduction admixing said polymerization product with ethylene having a temperature of at least 100° C. below that of the reaction zone in an amount sufficient to promote the formation of polymer particles of reduced size.

4. In a process for producing a powdered ethylene polymer comprising polymerizing ethylene in contact with a free-radical initiator in a reaction zone at elevated pressure followed by withdrawing the polymerization product from the reaction zone and reducing the pressure of said polymer product to about atmospheric pressure, the improvement of subsequent to said polymerization and prior to said pressure reduction admixing said polymerization product with ethylene having a temperature of at least 100° C. below that of the reaction zone in an amount of at least 10 weight percent of the total weight of monomer fed to said reaction zone.

References Cited
UNITED STATES PATENTS

| | | | |
|---|---|---|---|
| 2,831,845 | 4/1958 | Biddle et al. | 260—94.9 |
| 3,090,778 | 5/1963 | Ehrlich et al. | 260—94.9 |

JOSEPH L. SCHOFER, *Primary Examiner.*

L. EDELMAN, *Assistant Examiner.*